US012659961B2

(12) United States Patent
Zewail et al.

(10) Patent No.: US 12,659,961 B2
(45) Date of Patent: Jun. 16, 2026

(54) EARLY FEEDBACK FOR A MULTIPLE PHYSICAL DOWNLINK SHARED CHANNEL GRANT

(71) Applicant: QUALCOMM Incorporated, San Diego, CA (US)

(72) Inventors: Ahmed Abdelaziz Ibrahim Abdelaziz Zewail, San Diego, CA (US); Jing Sun, San Diego, CA (US); Xiaoxia Zhang, San Diego, CA (US); Qingjiang Tian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 576 days.

(21) Appl. No.: 17/659,356

(22) Filed: Apr. 15, 2022

(65) Prior Publication Data

US 2022/0408460 A1     Dec. 22, 2022

Related U.S. Application Data

(60) Provisional application No. 63/202,562, filed on Jun. 16, 2021.

(51) Int. Cl.
| | |
|---|---|
| *H04W 72/23* | (2023.01) |
| *H04L 1/1829* | (2023.01) |
| *H04L 5/00* | (2006.01) |

(52) U.S. Cl.
CPC ........... *H04W 72/23* (2023.01); *H04L 1/1854* (2013.01); *H04L 5/0055* (2013.01)

(58) Field of Classification Search
CPC ............. H04W 72/1268; H04W 72/21; H04W 72/23–232; H04L 5/0055; H04L 1/1812; H04L 1/1584

USPC .......................................................... 370/336
See application file for complete search history.

(56) References Cited

U.S. PATENT DOCUMENTS

| | | | | |
|---|---|---|---|---|
| 2012/0106408 | A1* | 5/2012 | Papasakellariou ........ | H04J 3/00 |
| | | | | 370/280 |
| 2014/0269459 | A1* | 9/2014 | Fan ....................... | H04W 76/23 |
| | | | | 370/294 |
| 2020/0374040 | A1* | 11/2020 | Lou ........................ | H04L 1/1812 |
| 2022/0045805 | A1* | 2/2022 | Karaki .................. | H04L 1/1864 |
| 2022/0240294 | A1* | 7/2022 | Oh ........................ | H04L 1/1812 |

(Continued)

FOREIGN PATENT DOCUMENTS

| | | | | | |
|---|---|---|---|---|---|
| KR | 10-2021-0006812 | * | 1/2021 | ........ | H04W 72/1289 |

OTHER PUBLICATIONS

"Zeng et al., Codebook Setting, Receiving Method, Device, Terminal And Network Side Device, Oct. 11, 2022, CN 115174019" (Year: 2021).*

(Continued)

*Primary Examiner* — Kevin C. Harper
(74) *Attorney, Agent, or Firm* — Harrity & Harrity, LLP

(57) ABSTRACT

Various aspects of the present disclosure generally relate to wireless communication. In some aspects, a user equipment (UE) may receive a grant associated with a plurality of physical shared channel resources. The UE may transmit a communication indicating feedback for the plurality of physical shared channel resources using a slot offset value that is less than a decoding timeline for at least one of the plurality of physical shared channel resources. Numerous other aspects are described.

30 Claims, 11 Drawing Sheets

500

(56)  References Cited

U.S. PATENT DOCUMENTS

2023/0006798 A1 *  1/2023  Lee ...................... H04L 1/1607
2024/0236985 A1 *  7/2024  Lei ....................... H04L 1/1812

OTHER PUBLICATIONS

"Zeng et al., Feedback Method, Related Device And Readable Storage Medium, Sep. 30, 2022, CN 115134918" (Year: 2021).*
"Hong et al., Information Feedback, Information Sending Method, Device, Terminal And Network Side Device, Sep. 13, 2022" (Year: 2021).*

* cited by examiner

300

310
PDSCH TDRA Table

| Row Index (*m*) | dmrs-TypeA-Position | PDSCH mapping type | k0 | S | L |
|---|---|---|---|---|---|
| 1 | 2 | Type A | 0 | 2 | 12 |
| | 3 | Type A | 0 | 3 | 11 |
| ... | ... | ... | ... | ... | ... |
| 9 | 2, 3 | Type B | 0 | 5 | 2 |
| ... | ... | ... | ... | ... | ... |

314
k0 parameter indicates slot offset between PDCCH and scheduled PDSCH k0 = 3 k1 = 5

316
k1 parameter indicates slot offset between PDSCH and PUCCH including ACK/NACK feedback 312
PDCCH occasion in which DCI scheduling PDSCH is received Special slot    Uplink slots 320
PUSCH TDRA Table

| Row Index (m) | PUSCH mapping type | k2 | S | L |
|---|---|---|---|---|
| 1 | Type A | 0 | 0 | 14 |
| ... | ... | ... | ... | ... |
| 10 | Type A | 1 | 0 | 10 |
| ... | ... | ... | ... | ... |

300

322
PDCCH occasion in which DCI scheduling PUSCH is received

Special slot    Uplink slots k2 = 5

324
k0 parameter indicates slot offset between PDCCH and scheduled PUSCH

400

404
k0 parameter indicates slot offset between PDCCH and scheduled PDSCHs

Special slot    Uplink slots k0 = 1 k1 = 5

402
PDCCH occasion in which DCI scheduling multiple PDSCHs is received 406
k1 parameter indicates slot offset between last PDSCH and PUCCH including ACK/NACK feedback Receive a grant associated with a plurality of physical shared channel resources Transmit a communication indicating feedback for the plurality of physical shared channel resources using a slot offset value that is less than a decoding timeline for at least one of the plurality of physical shared channel resources

710

720

700

810  Transmit a grant associated with a plurality of physical shared channel resources 820  Receive a communication indicating feedback for the plurality of physical shared channel resources, the communication using a slot offset value that is less than a decoding timeline for at least one of the plurality of physical shared channel resources

800

EARLY FEEDBACK FOR A MULTIPLE PHYSICAL DOWNLINK SHARED CHANNEL GRANT

CROSS-REFERENCE TO RELATED APPLICATION

This patent application claims priority to U.S. Provisional Patent Application No. 63/202,562 filed on Jun. 16, 2021, entitled "EARLY FEEDBACK FOR A MULTIPLE PHYSICAL DOWNLINK SHARED CHANNEL GRANT," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for early feedback for a multiple physical downlink shared channel grant.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving a grant associated with a plurality of physical shared channel resources. The method may include transmitting a communication indicating feedback for the plurality of physical shared channel resources using a slot offset value that is less than a decoding timeline for at least one of the plurality of physical shared channel resources.

Some aspects described herein relate to a method of wireless communication performed by a network node. The method may include transmitting a grant associated with a plurality of physical shared channel resources. The method may include receiving a communication indicating feedback for the plurality of physical shared channel resources, the communication using a slot offset value that is less than a decoding timeline for at least one of the plurality of physical shared channel resources.

Some aspects described herein relate to a user equipment (UE) for wireless communication. The user equipment may include a memory and one or more processors coupled to the memory. The one or more processors may be configured to receive a grant associated with a plurality of physical shared channel resources. The one or more processors may be configured to transmit a communication indicating feedback for the plurality of physical shared channel resources using a slot offset value that is less than a decoding timeline for at least one of the plurality of physical shared channel resources.

Some aspects described herein relate to a network node for wireless communication. The network node may include a memory and one or more processors coupled to the memory. The one or more processors may be configured to transmit a grant associated with a plurality of physical shared channel resources. The one or more processors may be configured to receive a communication indicating feedback for the plurality of physical shared channel resources, the communication using a slot offset value that is less than a decoding timeline for at least one of the plurality of physical shared channel resources.

Some aspects described herein relate to a non-transitory computer-readable medium that stores a set of instructions for wireless communication by a user equipment (UE). The set of instructions, when executed by one or more processors of the UE, may cause the UE to receive a grant associated with a plurality of physical shared channel resources. The set of instructions, when executed by one or more processors of the UE, may cause the UE to transmit a communication indicating feedback for the plurality of physical shared channel resources using a slot offset value that is less than a decoding timeline for at least one of the plurality of physical shared channel resources.

Some aspects described herein relate to a non-transitory computer-readable medium that stores a set of instructions for wireless communication by a network node. The set of instructions, when executed by one or more processors of the network node, may cause the network node to transmit a grant associated with a plurality of physical shared channel resources. The set of instructions, when executed by one or more processors of the network node, may cause the network node to receive a communication indicating feedback for the plurality of physical shared channel resources, the communication using a slot offset value that is less than a decoding timeline for at least one of the plurality of physical shared channel resources.

Some aspects described herein relate to an apparatus for wireless communication. The apparatus may include means for receiving a grant associated with a plurality of physical shared channel resources. The apparatus may include means for transmitting a communication indicating feedback for the plurality of physical shared channel resources using a slot offset value that is less than a decoding timeline for at least one of the plurality of physical shared channel resources.

Some aspects described herein relate to an apparatus for wireless communication. The apparatus may include means for transmitting a grant associated with a plurality of physical shared channel resources. The apparatus may include means for receiving a communication indicating feedback for the plurality of physical shared channel resources, the communication using a slot offset value that is less than a decoding timeline for at least one of the plurality of physical shared channel resources.

Aspects generally include a method, apparatus, system, computer program product, non-transitory computer-readable medium, user equipment, base station, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
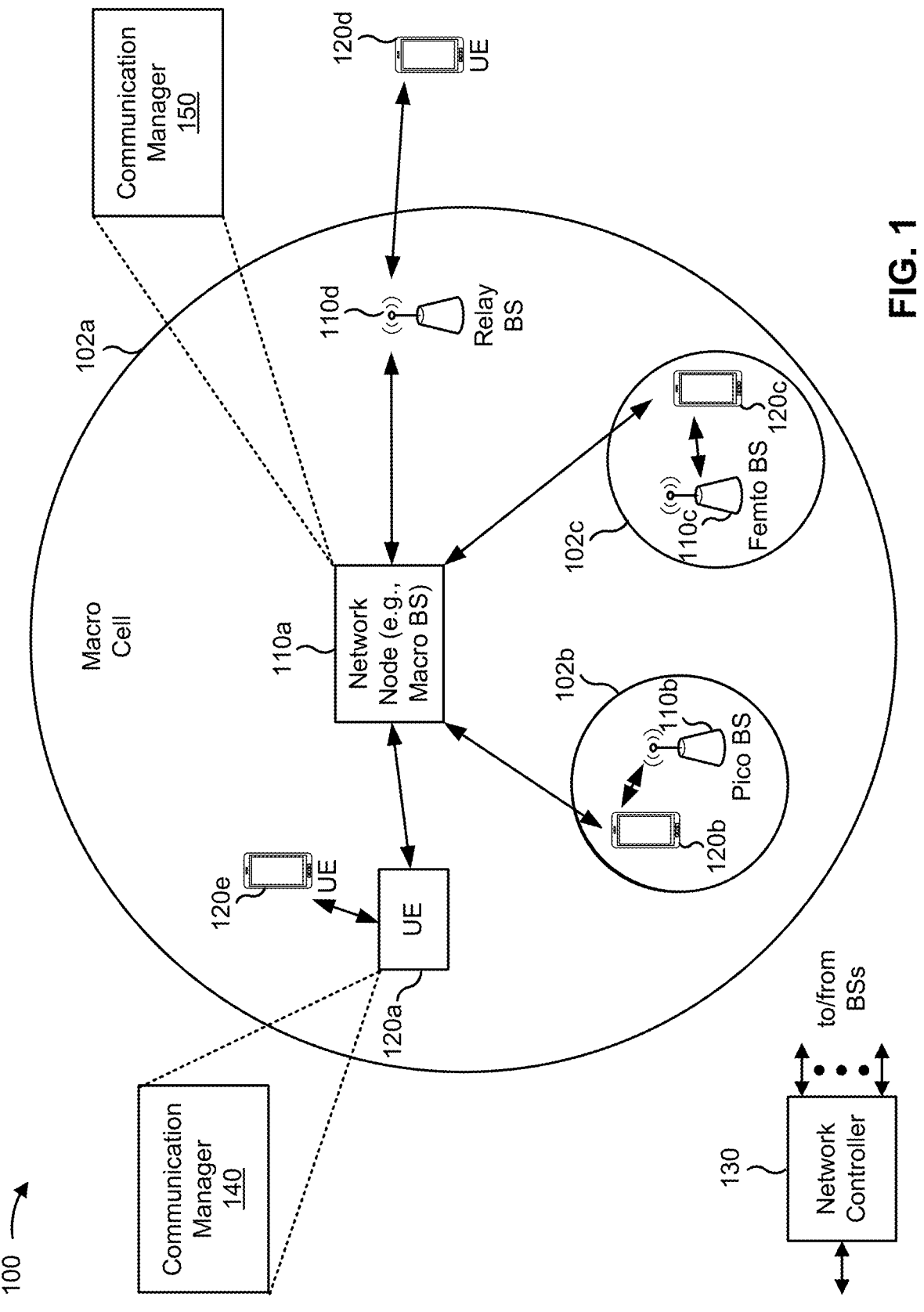
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A network node 110 is an entity that communicates with UEs 120. A network node 110 (e.g., a base station, sometimes referred to as a BS) may include, for example, an NR base station, an LTE base station, a Node B, an eNB (e.g., in 4G), a gNB (e.g., in 5G), an access point, and/or a transmission reception point (TRP). Each network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used.

A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro base station. A network node 110 for a pico cell may be referred to as a pico base station. A network node 110 for a femto cell may be referred to as a femto base station or an in-home base station. In the example shown in FIG. 1, the network node 110a may be a macro base station for a macro cell 102a, the BS 110b may be a pico base station for a pico cell 102b, and the BS 110c may be a femto base station for a femto cell 102c. A network node may support one or multiple (e.g., three) cells.

In some examples, a cell may not necessarily be stationary, and the geographic area of the cell may move according to the location of a network node 110 that is mobile (e.g., a mobile network node). In some examples, the network nodes 110 may be interconnected to one another and/or to one or more other network nodes 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a network node 110 or a UE 120) and send a transmission of the data to a downstream station (e.g., a UE 120 or a network node 110). A relay station may be a UE 120 that can relay transmissions for other UEs 120. In the example shown in FIG. 1, the BS 110d (e.g., a relay base station) may communicate with the network node 110a (e.g., a macro base station) and the UE 120d in order to facilitate communication between the network node 110a and the UE 120d. A network node 110 that relays communications may be referred to as a relay station, a relay base station, a relay, or the like.

The wireless network 100 may be a heterogeneous network that includes network nodes 110 of different types, such as macro base stations, pico base stations, femto base stations, relay base stations, or the like. These different types of network nodes 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link. The network nodes 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, a base station, or a network equipment may be implemented in an aggregated or disaggregated architecture. For example, a base station (such as a Node B (NB), evolved NB (eNB), NR base station (BS), 5G NB, gNodeB (gNB), access point (AP), TRP, or cell), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more centralized units (CUs), one or more distributed units (DUs), one or more radio units (RUs), or a combination thereof).

An aggregated base station may be configured to utilize a radio protocol stack that is physically or logically integrated within a single RAN node (for example, within a single device or unit). A disaggregated base station may be configured to utilize a protocol stack that is physically or logically distributed among two or more units (such as one or more CUs, one or more DUs, or one or more RUs). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU, and RU also may be implemented as virtual units (e.g., a virtual central unit (VCU), a virtual distributed unit (VDU), or a virtual radio unit (VRU)).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that may be individually deployed. A disaggregated base station may include functionality implemented across two or more units at various physical locations, as well as functionality implemented for at least one unit virtually, which may enable flexibility in network design. The various units of the disaggregated base station may be configured for wired or wireless communication with at least one other unit of the disaggregated base station.

In some aspects, the UE 120 may include a communication manager 140. As described in more detail elsewhere herein, the communication manager 140 may receive a grant associated with a plurality of physical shared channel resources, and transmit a communication indicating feedback for the plurality of physical shared channel resources using a slot offset value that is less than a decoding timeline for at least one of the plurality of physical shared channel resources. Additionally, or alternatively, the communication manager 140 may perform one or more other operations described herein.

In some aspects, the network node 110 may include a communication manager 150. As described in more detail elsewhere herein, the communication manager 150 may transmit a grant associated with a plurality of physical shared channel resources, and receive a communication indicating feedback for the plurality of physical shared channel resources, the communication using a slot offset value that is less than a decoding timeline for at least one of the plurality of physical shared channel resources. Additionally, or alternatively, the communication manager 150 may perform one or more other operations described herein.

As indicated above, FIG. 1 is provided as an example. Other examples may differ from what is described with regard to FIG. 1.

Figure 2:
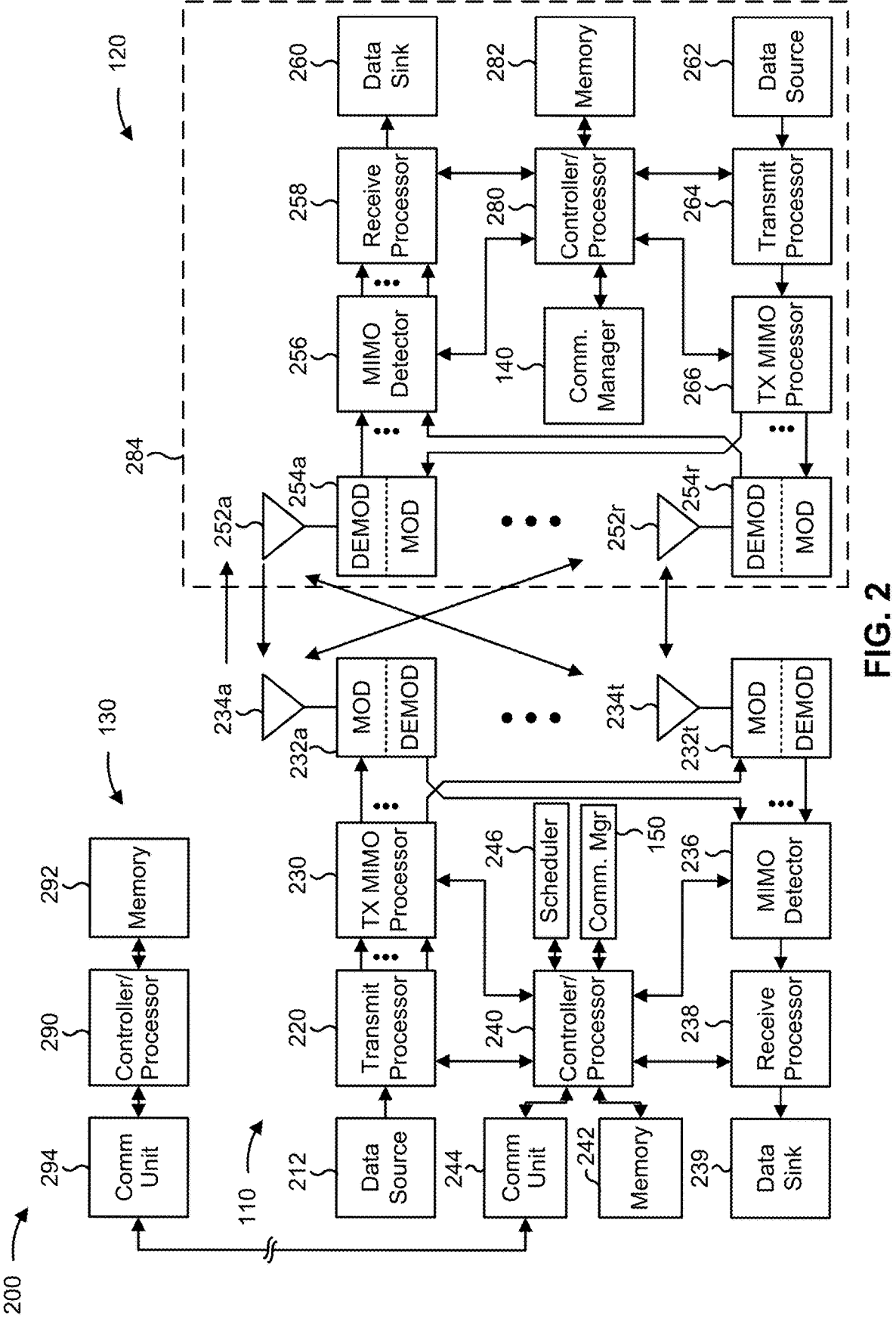
FIG. 2 is a diagram illustrating an example of a network node in communication with a user equipment (UE) in a wireless network, in accordance with the present disclosure.

FIG. 2 is a diagram illustrating an example 200 of a network node 110 (e.g., a base station) in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1).

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-8).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-8).

The controller/processor 240 of the network node 110, the controller/processor 280 of the UE 120, and/or any other component(s) of FIG. 2 may perform one or more techniques associated with early feedback for a multiple physical downlink shared channel grant, as described in more detail elsewhere herein. For example, the controller/processor 240 of the network node 110, the controller/processor 280 of the UE 120, and/or any other component(s) of FIG. 2 may perform or direct operations of, for example, process 700 of FIG. 7, process 800 of FIG. 8, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 700 of FIG. 7, process 800 of FIG. 8, and/or other processes as described herein. In some examples, executing instructions may include running the instructions, converting the instructions, compiling the instructions, and/or interpreting the instructions, among other examples.

In some aspects, the UE includes means for receiving a grant associated with a plurality of physical shared channel resources; and/or means for transmitting a communication indicating feedback for the plurality of physical shared channel resources using a slot offset value that is less than a decoding timeline for at least one of the plurality of physical shared channel resources. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node includes means for transmitting a grant associated with a plurality of physical shared channel resources; and/or means for receiving a communication indicating feedback for the plurality of physical shared channel resources, the communication using a slot offset value that is less than a decoding timeline for at least one of the plurality of physical shared channel resources. The means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3A:
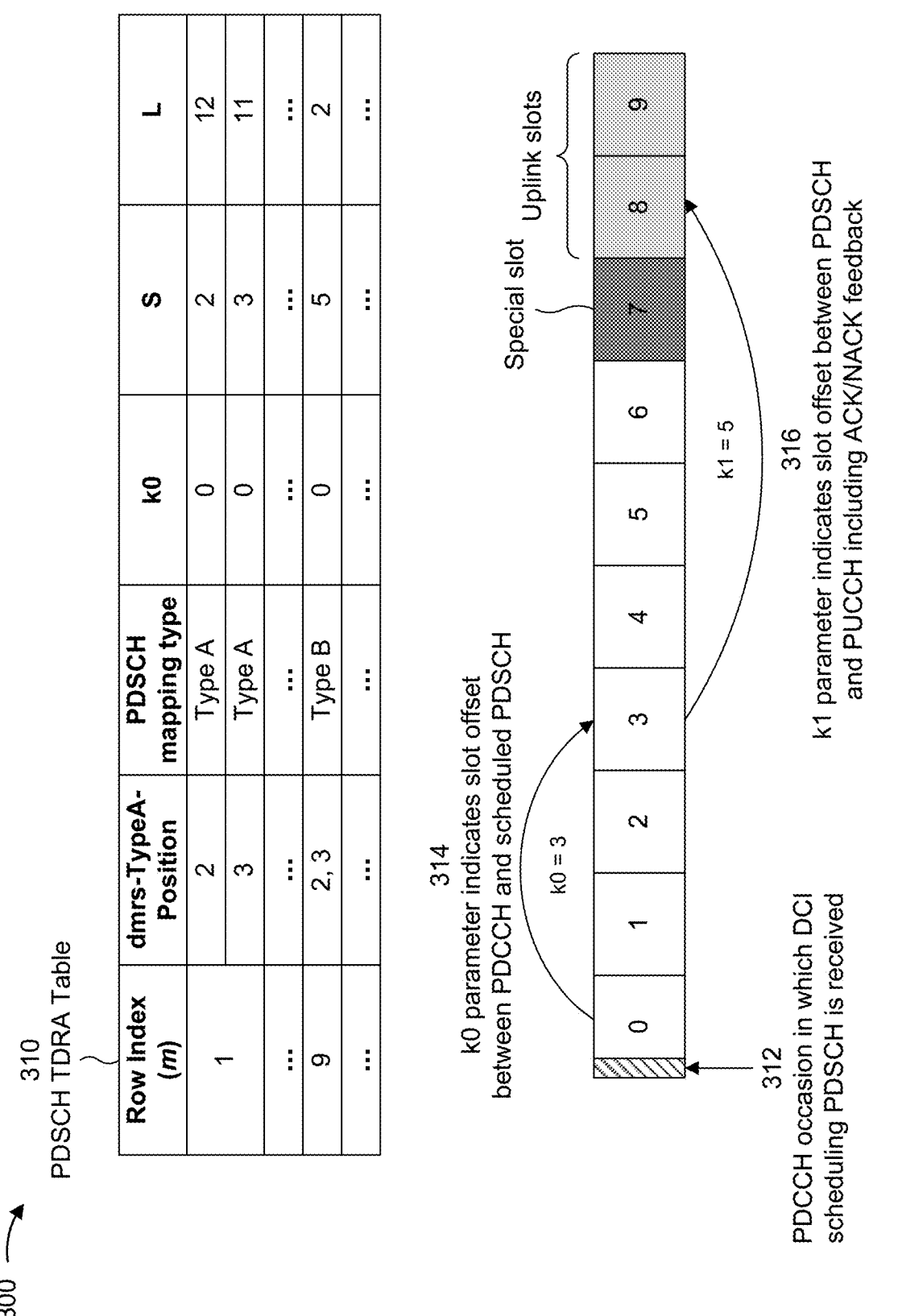
FIGS. 3A and 3B are diagrams illustrating examples of time domain resource assignments, in accordance with the present disclosure.
Figure 3B:
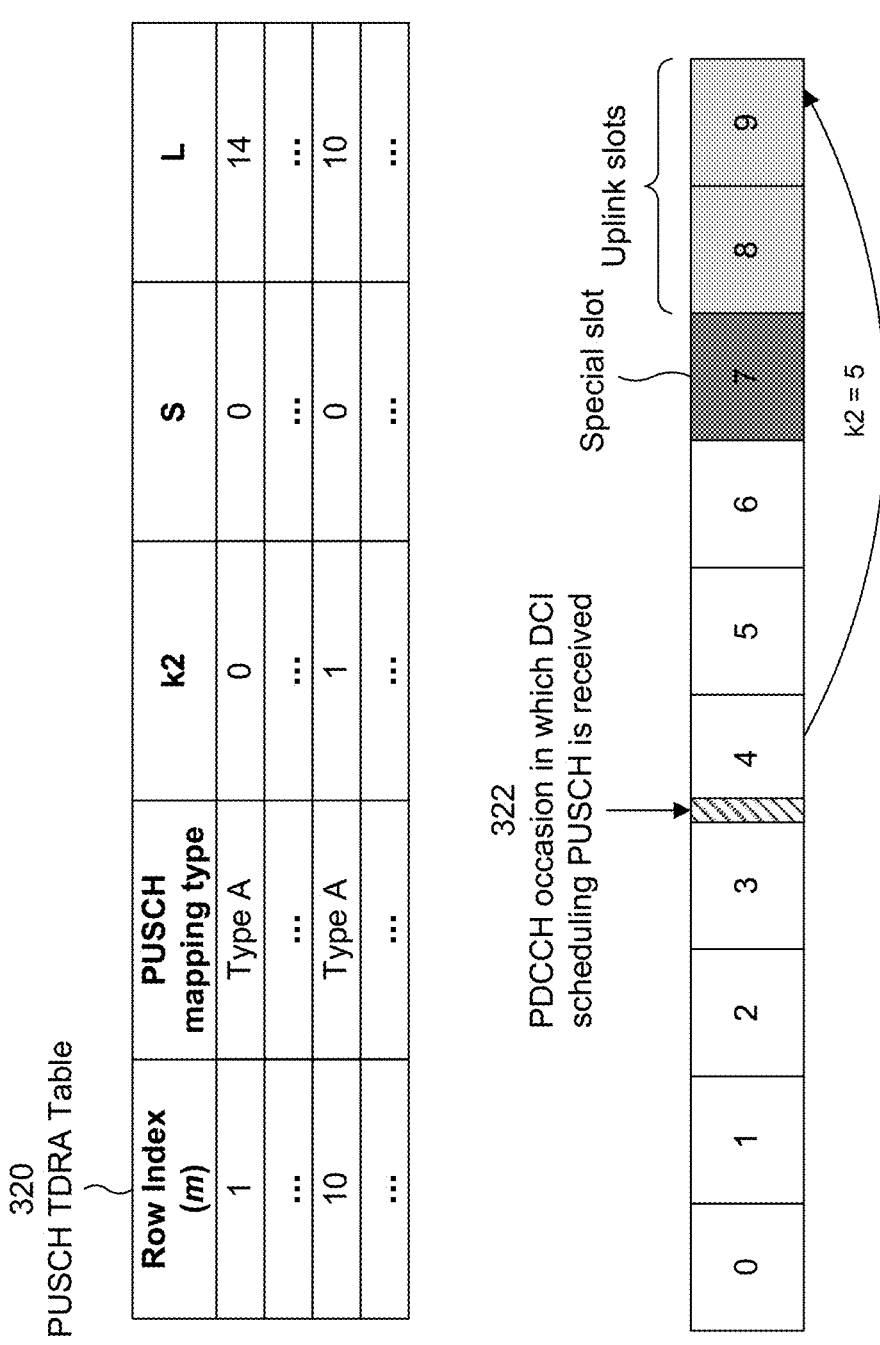

FIGS. 3A-3B are diagrams illustrating examples 300 of time domain resource assignments, in accordance with the present disclosure. FIG. 3A shows an example downlink time domain resource allocation (TDRA) table 310 and FIG. 3B shows an example uplink TDRA table 320. The downlink TDRA table 310 may be, for example, a physical downlink shared channel (PDSCH) TDRA table. The uplink TDRA table 320 may be, for example, a physical uplink shared channel (PUSCH) TDRA table. In some aspects, the network node 110 and the UE 120 may use different TDRA tables than those shown in FIGS. 3A-3B, such as for different configurations, different cells, and/or different subcarrier spacings of cells.

When scheduling a downlink communication or an uplink communication, a network node 110 may transmit downlink control information (DCI) that indicates a TDRA for the downlink or uplink communication. For example, the DCI may include a TDRA field that includes a TDRA index value. The TDRA index value may indicate a row index of a corresponding TDRA table, and the row index may correspond to a set of TDRA parameters (sometimes referred to as scheduling parameters or scheduling information). The network node 110 and the UE 120 may use the TDRA parameters in the corresponding row index for the downlink or uplink communication scheduled by the DCI. In the examples shown in FIGS. 3A-3B, a TDRA index value of m in the DCI may correspond to a row index of m+1 in the TDRA table. For example, a TDRA index value of 0 may correspond to a row index of 1.

As shown in FIG. 3A, for a downlink communication (e.g., a PDSCH communication), the TDRA parameters may include, for example, a k0 value, an S value, and an L value. The k0 value may represent a timing offset (e.g., in number of slots) between a slot containing the scheduling DCI (carrying a grant that schedules the PDSCH communication) and a slot containing the scheduled PDSCH communication (scheduled by the scheduling DCI). For example, as shown in FIG. 3A, and by reference number 312, a UE may receive DCI scheduling a PDSCH in a physical downlink control channel (PDCCH) monitoring occasion of slot number 0, and a value of the k0 parameter may indicate the slot in which the UE can expect to receive the PDSCH scheduled by the DCI. For example, as shown by reference number 314, the UE may expect to receive the PDSCH in slot number 3 based on receiving the scheduling DCI in slot number 0 with the k0 parameter indicating a timing offset of three (3) slots. The S value may represent a starting symbol for the PDSCH communication in the indicated slot. The L value may represent a length (e.g., a number of consecutive symbols) of the PDSCH communication (e.g., in the indicated slot). In some cases, the S value and the L value may collectively be referred to as a start and length indicator value (SLIV). In some aspects, the same row index value may correspond to a different set of TDRA parameters depending on a Type A DMRS position (e.g., a symbol within a resource block that contains the DMRS) and/or a PDSCH mapping type (e.g., indicating a starting symbol of the DMRS, a length of the DMRS, and/or whether slot-based scheduling or mini-slot-based scheduling is used). Furthermore, in some aspects, a k1 parameter may be used to indicate a timing offset between the PDSCH scheduled by the DCI and a slot in which the UE is to transmit a physical uplink control channel (PUCCH) that carries acknowledgement/negative acknowledgement (ACK/NACK) feedback for the PDSCH. For example, as shown by reference number 316, the UE may expect to receive a PDSCH in slot number 3 based on the value of the k0 parameter, and may transmit a PUCCH that carries ACK/NACK feedback for the PDSCH in slot number 8 based on the k1 parameter indicating a timing offset of five (5) slots from the slot in which the PDSCH is scheduled (e.g., slot number 3 in the illustrated example).

As shown in FIG. 3B, for an uplink communication (e.g., a PUSCH communication), the TDRA parameters may include, for example, a k2 value, an S value, and an L value. The k2 value may represent a timing offset (e.g., in number of slots) between a slot containing the scheduling DCI (carrying a grant that schedules the PUSCH communication) and a slot containing the scheduled PUSCH communication (scheduled by the scheduling DCI). For example, as shown in FIG. 3B, and by reference number 322, a UE may receive DCI scheduling a PUSCH in a PDCCH monitoring occasion of slot number 4, and a value of the k2 parameter may indicate the slot in which the UE can expect to receive the PUSCH scheduled by the DCI. For example, as shown by reference number 324, the UE may expect to receive the PUSCH in slot number 9 based on receiving the scheduling DCI in slot number 4 with the k2 parameter indicating a timing offset of five (5) slots. The S value may represent a starting symbol for the PUSCH communication in the indicated slot. The L value may represent a length (e.g., a number of consecutive symbols) of the PUSCH communication (e.g., in the indicated slot). In some aspects, the same row index value may correspond to a different set of TDRA parameters depending on, for example, a PUSCH mapping type (e.g., indicating a starting symbol of the DMRS, a length of the DMRS, and/or whether slot-based scheduling or mini-slot-based scheduling is used).

Accordingly, a k0 parameter may indicate a timing offset (or slot offset) between a slot in which a PDCCH is received and a slot in which a PDSCH granted by the PDCCH is scheduled, a k1 parameter may indicate a timing offset between the slot in which the PDSCH is scheduled and a slot in which a UE is to transmit ACK/NACK feedback for the PDSCH, and/or a k2 parameter may indicate a timing offset between a slot in which a PDCCH is received and a slot in which a PUSCH granted by the PDCCH is scheduled.

In general, some timing offset values may cause challenges in higher frequency bands, such as frequencies in FR4 (e.g., from 52.6 GHz to 71 GHz), where a large subcarrier spacing (e.g., 480 kHz, 960 kHz, 1.9 MHz, 3.8 MHz, or higher) may be needed to support a larger bandwidth with the same Fast Fourier transform (FFT) size as lower frequency bands. For example, a higher subcarrier spacing is generally associated with a shorter slot duration (e.g., whereas a 15 kHz subcarrier spacing is associated with a 1 millisecond (ms) slot duration and a 30 kHz subcarrier spacing is associated with a 0.5 ms slot duration, a 480 kHz subcarrier spacing is associated with a slot duration of 31.25 microseconds (μs) and a 960 kHz subcarrier spacing is associated with a 15.625 μs slot duration. Accordingly, due to the very short slot durations, wireless communications that use a high subcarrier spacing (e.g., 480 kHz or higher)

may support a multi-PDSCH and/or multi-PUSCH grant (e.g., where one DCI schedules multiple PDSCH and/or PUSCH communications) and/or multi-slot PDCCH monitoring (e.g., where the UE monitors a PDCCH occasion only once every M slots), as described herein.

As indicated above, FIGS. 3A-3B are provided as examples. Other examples may differ from what is described with regard to FIGS. 3A-3B.

Figure 4:
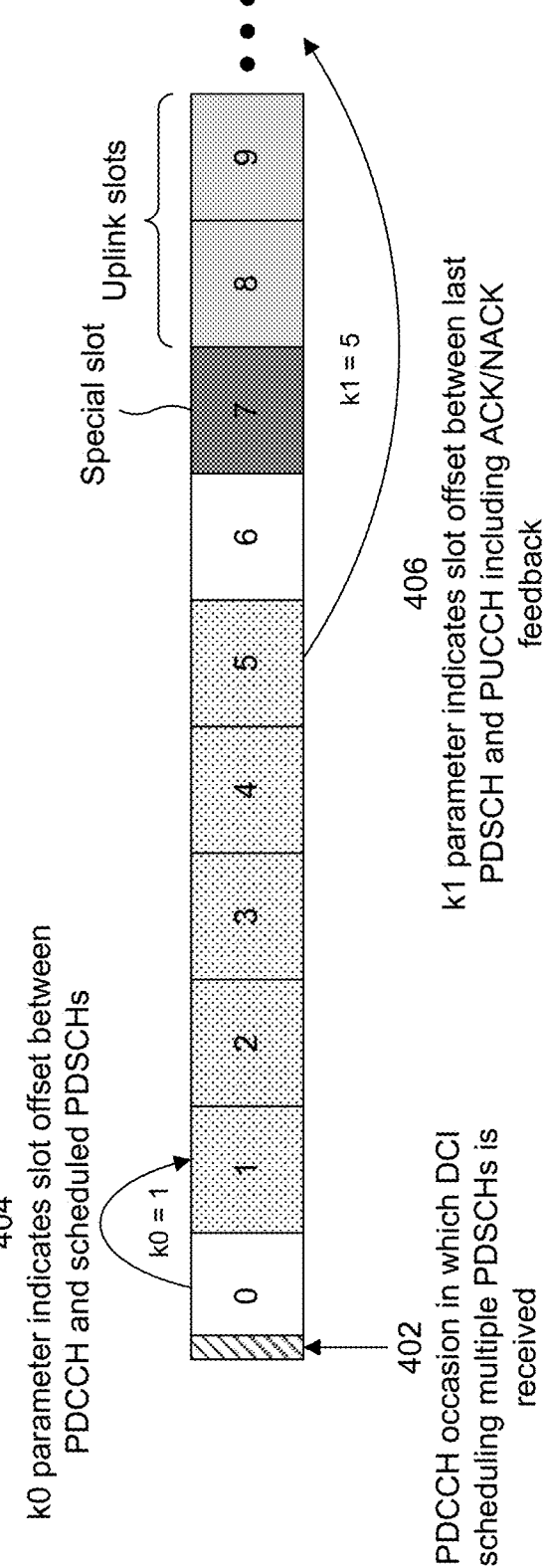
FIG. 4 is a diagram illustrating an example of a multi-physical downlink shared channel (multi-PDSCH) grant, in accordance with the present disclosure.

FIG. 4 is a diagram illustrating an example 400 of a multi-PDSCH grant, in accordance with the present disclosure. As shown in FIG. 4, and by reference number 402, a UE may receive DCI scheduling multiple PDSCHs in a PDCCH monitoring occasion of slot number 0, and a value of the k0 parameter may indicate the first slot in which the UE can expect to receive the PDSCHs scheduled by the DCI, as well as a downlink assignment index (DAI) value indicating the number of PDSCHs scheduled by the DCI. For example, as shown by reference number 404, the UE may expect to receive the first PDSCH in slot number 1 based on receiving the scheduling DCI in slot number 0 with the k0 parameter indicating a timing offset of one (1) slot. As shown by reference number 406, the k1 parameter indicates the timing offset between the last PDSCH scheduled by the DCI and a slot in which the UE is to transmit a PUCCH that carries ACK/NACK feedback for the multiple PDSCHs. The timing offset (e.g., k1 parameter) may be selected in a manner designed to satisfy a PDSCH decoding timeline n1 (e.g., an amount of time it takes for the UE to decode a PDSCH), such that feedback for the multiple PDSCHs will not be transmitted until all of the multiple PDSCHs (5 in this example) have time to be decoded. In this example, the k1 value of 5 slots, calculated from the last PDSCH received in slot 5, and based on an PDSCH decoding timeline of n1=5, causes the UE's ACK/NACK feedback to be delayed (e.g., until a next uplink slot) for the multiple PDSCHs.

Accordingly, with PDCCH grants scheduling multiple PDSCH communications in a single DCI, a single k1 value may be chosen in a manner designed to ensure that a PDSCH decoding timeline n1 has been satisfied for all of the multiple PDSCH communications. In this situation, calculating k1 from a last PDSCH of a multiple PDSCH communication may result in delayed ACK/NACK feedback.

As indicated above, FIG. 4 is provided as an example. Other examples may differ from what is described with respect to FIG. 4.

Some aspects described herein relate to techniques and apparatuses to enable indicating feedback for multiple physical shared channel resources using a slot offset value (e.g., k1) that is less than a decoding timeline (e.g., n1) for at least one of the multiple physical shared channel resources. For example, as described herein, a network node may transmit, and a UE may receive, a multi-PDSCH grant. The UE may use a slot offset value that is less than a PDSCH decoding timeline for at least one of the multiple PDSCHs (e.g., the PDSCHs that have already been decoded).

In this way, a UE may provide early feedback for a multi-PDSCH grant. For example, rather than waiting until feedback can be determined for every PDSCH associated with a multi-PDSCH grant, the UE may provide feedback for a subset of the PDSCHs that have been decoded early (e.g., in time to be transmitted via a first PUCCH), and the UE may follow up with remaining feedback in a next PUCCH. This enables feedback to be transmitted and received quickly and with limited overhead, improving feedback communications and processes, which may improve efficiency (e.g., processing efficiency, power efficiency, and/or the like) of wireless networks.

Figure 5:
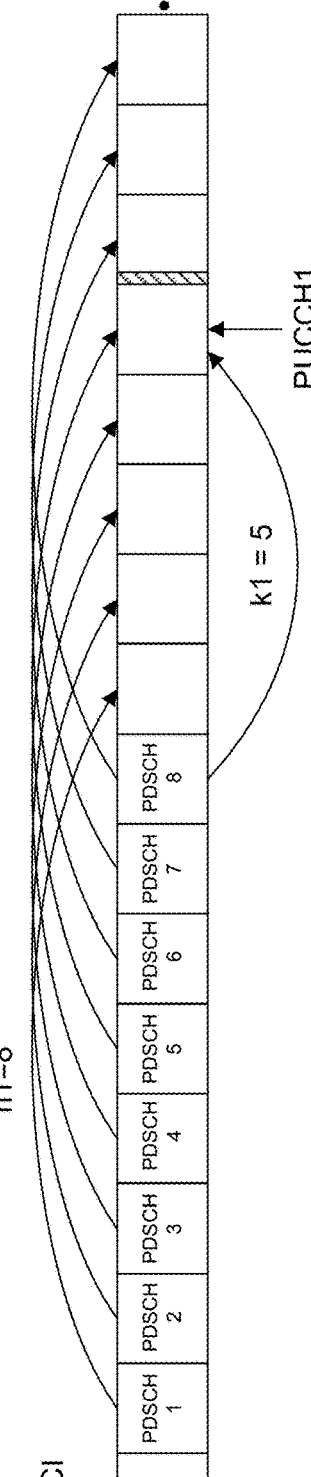
FIG. 5 is a diagram illustrating an example associated with early feedback for multi-PDSCH communications, in accordance with the present disclosure.

FIG. 5 is a diagram illustrating an example 500 associated with early feedback for multi-PDSCH communications, in accordance with the present disclosure. As shown in FIG. 5, a DCI including a multi-PDSCH grant may be transmitted by a UE and received by a network node. In this example 500, the DCI schedules eight (8) PDSCHs. The decoding timeline (n1) in this example is 8, indicating that each PDSCH should be decoded within 8 slots from receipt of the PDSCH. The UE may use the slot offset value (k1=5 in this example 500), and the last slot of multi-PDSCH as a reference value (e.g., slot 8 in this example 500), to determine when the UE will provide feedback for the PDSCHs. In this situation, when the UE is configured to provide early feedback for a multi-PDSCH grant, the slot offset value (k1) may be less than the decoding timeline (n1). In example 500, the slot offset value (k1) is 5, which indicates that the UE is to provide feedback 5 slots after receiving the last PDSCH associated with the multi-PDSCH grant. This enables, for example, the UE to provide feedback for the first 5 PDSCHs in a first PUCCH (e.g., PUCCH1), as the first 5 PDSCHs should be decoded by the time the first PUCCH is scheduled for transmission. Feedback for the remaining 3 PDSCHs may be transmitted in a second PUCCH (e.g., a next PUCCH, such as PUCCH2).

As indicated above, FIG. 5 is provided as an example. Other examples may differ from what is described with respect to FIG. 5.

Figure 6:
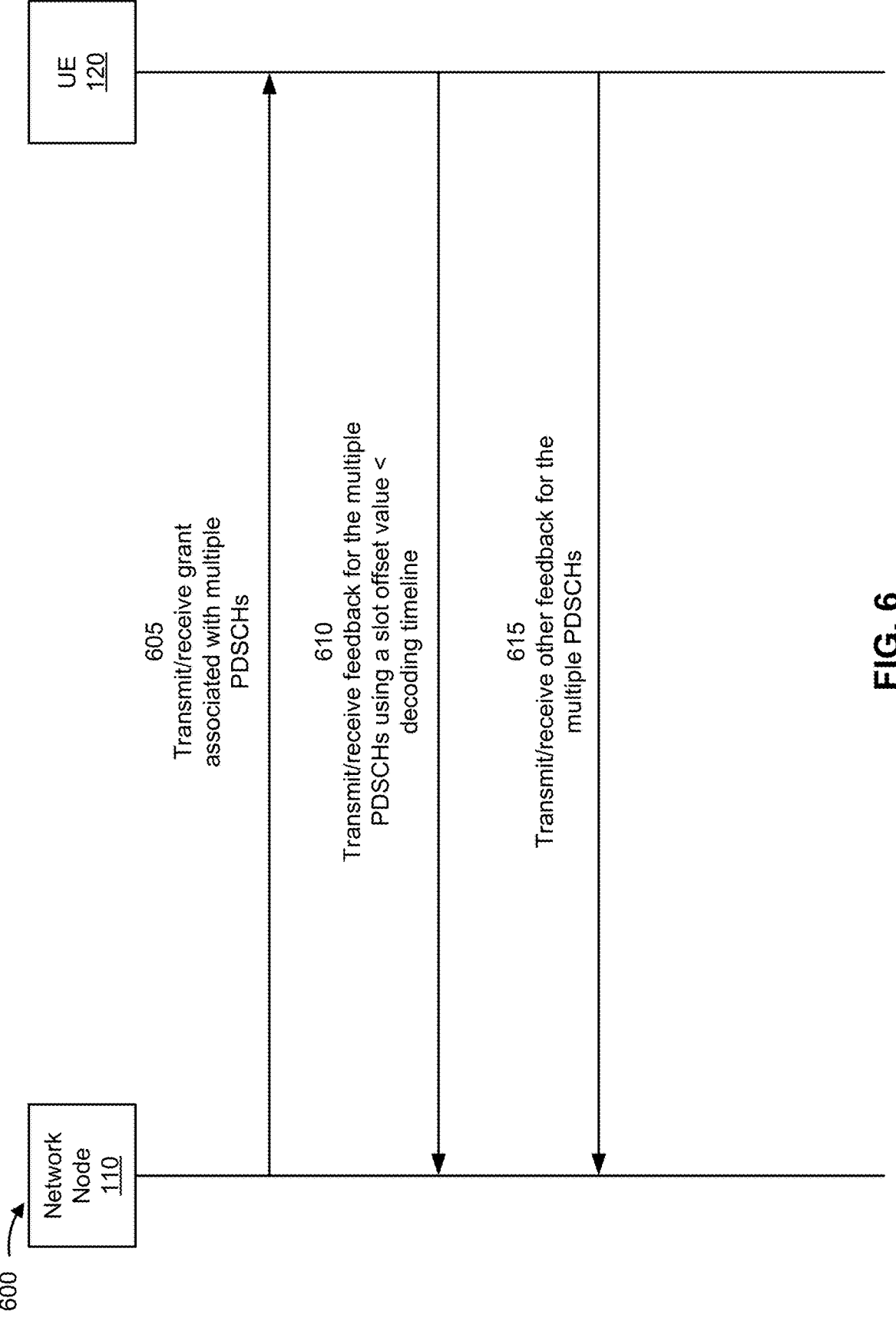
FIG. 6 is a diagram illustrating an example associated with early feedback for a multi-PDSCH grant, in accordance with the present disclosure.

FIG. 6 is a diagram illustrating an example 600 associated with early feedback for a multi-PDSCH grant, in accordance with the present disclosure. As shown in FIG. 6, a network node (e.g., network node 110) and a UE 120 may communicate with one another.

As shown by reference number 605, the network node may transmit, and the UE may receive, a grant associated with multiple physical shared channel resources (e.g., multiple PDSCHs). For example, the network node may transmit, and the UE may receive, DCI scheduling multiple PDSCHs.

As shown by reference number 610, the UE may transmit, and the network node may receive, a communication indicating feedback for the multiple physical shared channel resources using a slot offset value (e.g., k1) that is less than a decoding timeline (e.g., n1) for at least one of the plurality of physical shared channel resources. For example, in some aspects, the communication may be a PUCCH communication. In some aspects, the communication indicates feedback for a first subset of the multiple physical shared channel resources. For example, if a single DCI scheduled 8 PDSCHs, with k1 that does not meet a decoding timeline (n1) for the last 3 PDSCHs, the first subset may include the first five PDSCHs. In this situation, feedback (e.g., ACK/NACK feedback) for the first five PDSCHs may be indicated by the PUCCH communication.

In some aspects, the communication may include a set of feedback bits bundled based at least in part on a number of the plurality of physical shared channel resources received by the UE before transmission of the communication. For example, in a situation where time domain bundling is used to bundle the feedback, the feedback bits of the PUCCH may be bundled based at least in part on the PDSCHs received and/or decoded by the time of the first PUCCH. For example, in a situation where five PDSCHs are received and decoded before the first PUCCH, the first PUCCH may include the five received and decoded PDSCHs. In this situation, the set of ACK/NACK bits to be bundled may be defined based on the PDSCHs received by the time of the first PUCCH.

In some aspects, the UE may calculate a DAI for the communication, and the DAI may be used to indicate the PDSCHs for which the PUCCH is providing feedback (e.g., in a situation where multiple PUCCHs are used to provide feedback for a single multi-PDSCH grant, as described herein). In some aspects, the communication may include a fixed number of feedback bits for each DCI associated with the grant. For example, in a situation where a DAI is incremented per DCI, the fixed number of bits may be assumed to be feedback for the DCI. In a situation with no time domain bundling, a fixed number (e.g., preconfigured) of ACK/NACK bits may be feedback for each PDCCH, with potential NACK padding if the assigned number of PDSCH in the PDCCH is less than the fixed number. For the first PUCCH, the fixed number of bits may be reported per DCI. In some situations, the UE may NACK the PDSCHs within n1 and assume that DAI after the next grant after the first PUCCH will be incremented twice (e.g., incremented once for the new grant and another time for the previous DCI), and a fixed number of feedback bits may be reported as configured for each DCI. In this situation, the bits corresponding to the first grant may include the feedback of some PDSCHs that were carried by the first PUCCH.

In some aspects, the communication may be associated with a DAI that is incremented for each of the physical shared channel resources associated with the communication. For example, the UE may calculate the DAI by incrementing the DAI per PDSCH. In this situation, the DAI may be calculated taking into account all PDSCHs scheduled by the DCI, and the first PUCCH may consider only the PDSCHs that meet the decoding timeline (e.g., n1) for feedback. In some aspects, the UE may transmit the communication for a single grant per PDCCH monitoring occasion, e.g., in a manner designed to avoid errors in DAI calculation if DCI is missed. In some aspects, the communication may be associated with a DAI that is incremented for each of the PDSCH resources associated with slot offset values that are less than the decoding timeline. For example, the UE may increment the DAI for each PDSCH that meets the decoding timeline. In this situation, if an example grant has 4 SLIVs, 3 of which are in n1, the DAI may be 3. Based on detecting the DCI, the UE will consider the additional PDSCH to have nnk1. If DCI is missing, the next DCI may indicate a hole of 3, enabling the UE to fill in NACKs for the missing DCI, and the UE may start DAI from 1 for the next PUCCH with a valid k1, enabling the UE to fill in NACKs even when the first DCI is missing.

In some aspects, the communication may include two DAIs. In this situation, one DAI may be for the first PUCCH while the second DAI may be for a second PUCCH. While this would use additional DCI bits, the DCI may only use a single k1 value in the DCI and a single PUCCH resource indicator (PRI), which may decrease the overall DCI size.

As shown by reference number 615, the UE may transmit, and the network node may receive, another communication indicating second feedback for a second subset of the multiple physical shared channel resources (e.g., a second subset of the multiple PDSCHs). For example, if a single DCI scheduled 8 PDSCHs, with k1 that does not meet a decoding timeline (n1) for the last three PDSCHs, the second subset may include the last three PDSCHs. In some aspects, the UE may transmit the other communication indicating the second feedback using another slot offset value that corresponds to the slot offset value. For example, the feedback (e.g., ACK/NACK feedback) may be associated with a non-numerical slot offset value (e.g., a non-numerical k1, or nnk1), which indicates that the feedback may be provided in a next PUCCH that satisfies the decoding timeline (n1). In this situation, the feedback for the last three PDSCHs may be indicated by a second PUCCH communication transmitted after the decoding timeline (n1) of the last PDSCH of the multi-PDSCH grant.

In some aspects, the other communication may include a set of feedback bits bundled based at least in part on a number of the physical shared channel resources that were not received by the UE before transmission of the communication. For example, using time domain bundling, the second PUCCH may indicate ACK/NACK bits defined based on the number of PDSCHs that were not received by the first PUCCH (e.g., the last three PDSCHs in the example above).

In some aspects, the other communication includes a fixed number of feedback bits for each DCI associated with the grant, and the other communication includes an indication of non-acknowledgement associated with one or more of the physical shared channel resources. For example, where a next grant provides the second PUCCH, the DAI may be incremented starting from a number of DCIS with PDSCH, assuming nnk1. In some aspects, feedback for the first grant may be transmitted once in the first PUCCH (e.g., including NACK padding for the PDSCHs not received before the first PUCCH, as described herein), for the PDSCHs within n1, and the second PUCCH may include NACK padding for the PDSCHs in the first subset (e.g., the PDSCHs for which feedback was provided in the first PUCCH). In some aspects, the other communication is associated with another DAI that is incremented based at least in part on a value of the DAI. For example, the DAI may be incremented per PDSCH, and for the second PUCCH, the DAI may be incremented taking into account the PDSCHs that were assumed with nnk1 by the time of the first PUCCH.

As indicated above, FIG. 6 is provided as an example. Other examples may differ from what is described with respect to FIG. 6.

In this way, a UE may provide early feedback for a multi-PDSCH grant. For example, rather than waiting until feedback can be determined for every PDSCH associated with a multi-PDSCH grant, the UE may provide feedback for a subset of the PDSCHs that have been decoded early (e.g., in time to be transmitted via a first PUCCH), and the UE may follow up with remaining feedback in a next PUCCH. This enables feedback to be transmitted and received quickly and with limited overhead, improving feedback communications and processes, which may improve efficiency (e.g., processing efficiency, power efficiency, and/or the like) of wireless networks.

Figure 7:
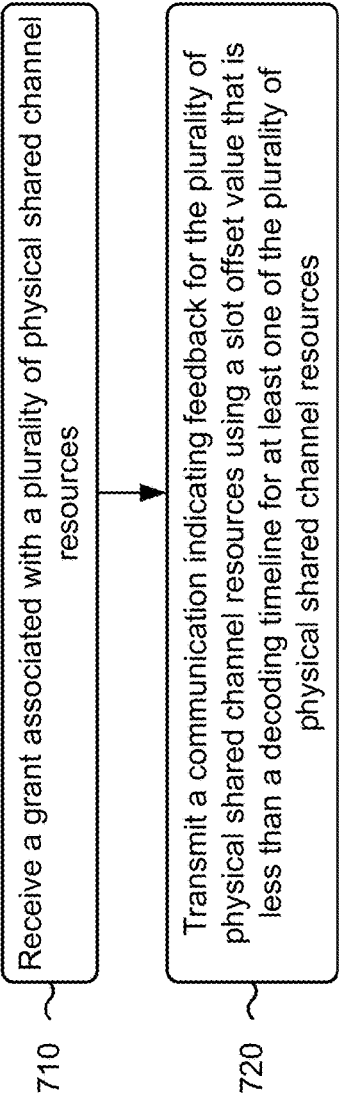
FIGS. 7 and 8 are diagrams illustrating example processes associated with early feedback for a multi-PDSCH grant, in accordance with the present disclosure.

FIG. 7 is a diagram illustrating an example process 700 performed, for example, by a UE, in accordance with the present disclosure. Example process 700 is an example where the UE (e.g., UE 120) performs operations associated with early feedback for a multiple physical downlink shared channel grant.

As shown in FIG. 7, in some aspects, process 700 may include receiving a grant associated with a plurality of physical shared channel resources (block 710). For example, the UE (e.g., using communication manager 140 and/or reception component 902, depicted in FIG. 9) may receive a grant associated with a plurality of physical shared channel resources, as described above.

As further shown in FIG. 7, in some aspects, process 700 may include transmitting a communication indicating feedback for the plurality of physical shared channel resources using a slot offset value that is less than a decoding timeline for at least one of the plurality of physical shared channel resources (block 720). For example, the UE (e.g., using communication manager 140 and/or transmission component 904, depicted in FIG. 9) may transmit a communication indicating feedback for the plurality of physical shared channel resources using a slot offset value that is less than a decoding timeline for at least one of the plurality of physical shared channel resources, as described above.

Process 700 may include additional aspects, such as any single aspect or any combination of aspects described below and/or in connection with one or more other processes described elsewhere herein.

In a first aspect, the communication indicates feedback for a first subset of the plurality of physical shared channel resources.

In a second aspect, alone or in combination with the first aspect, process 700 includes transmitting another communication indicating second feedback for a second subset of the plurality of physical shared channel resources.

In a third aspect, alone or in combination with one or more of the first and second aspects, transmitting the other communication indicating the second feedback comprises transmitting the other communication indicating the second feedback using another slot offset value that corresponds to the slot offset value.

In a fourth aspect, alone or in combination with one or more of the first through third aspects, the second subset of the plurality of physical shared channel resources is associated with a non-numerical slot offset value.

In a fifth aspect, alone or in combination with one or more of the first through fourth aspects, the other communication includes a set of feedback bits bundled based at least in part on a number of the plurality of physical shared channel resources that were not received by the UE before transmission of the communication.

In a sixth aspect, alone or in combination with one or more of the first through fifth aspects, the other communication includes a fixed number of feedback bits for each downlink control information associated with the grant, and the other communication includes an indication of non-acknowledgement associated with one or more of the plurality of physical shared channel resources.

In a seventh aspect, alone or in combination with one or more of the first through sixth aspects, the communication includes a set of feedback bits bundled based at least in part on a number of the plurality of physical shared channel resources received by the UE before transmission of the communication.

In an eighth aspect, alone or in combination with one or more of the first through seventh aspects, the communication includes a fixed number of feedback bits for each downlink control information associated with the grant.

In a ninth aspect, alone or in combination with one or more of the first through eighth aspects, the communication includes an indication of non-acknowledgement associated with one or more of the plurality of physical shared channel resources.

In a tenth aspect, alone or in combination with one or more of the first through ninth aspects, the communication is associated with a downlink assignment index that is incremented for each of the at least one of the plurality of physical shared channel resources.

In an eleventh aspect, alone or in combination with one or more of the first through tenth aspects, process 700 includes transmitting another communication indicating second feedback for a second subset of the plurality of physical shared channel resources, wherein the second subset includes one or more physical shared channel resources of the plurality of physical shared channel resources that are not included in the at least one of the plurality of physical shared channel resources, and wherein the other communication is associated with another downlink assignment index that is incremented based at least in part on a value of the downlink assignment index.

In a twelfth aspect, alone or in combination with one or more of the first through eleventh aspects, transmitting the communication comprises transmitting the communication for a single grant per physical downlink control channel monitoring occasion.

In a thirteenth aspect, alone or in combination with one or more of the first through twelfth aspects, the communication is associated with a downlink assignment index that is incremented for each of the plurality of physical shared channel resources associated with slot offset values that are less than the decoding timeline.

In a fourteenth aspect, alone or in combination with one or more of the first through thirteenth aspects, the communication includes two downlink assignment indices.

In a fifteenth aspect, alone or in combination with one or more of the first through fourteenth aspects, the communication comprises a physical uplink control channel communication.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
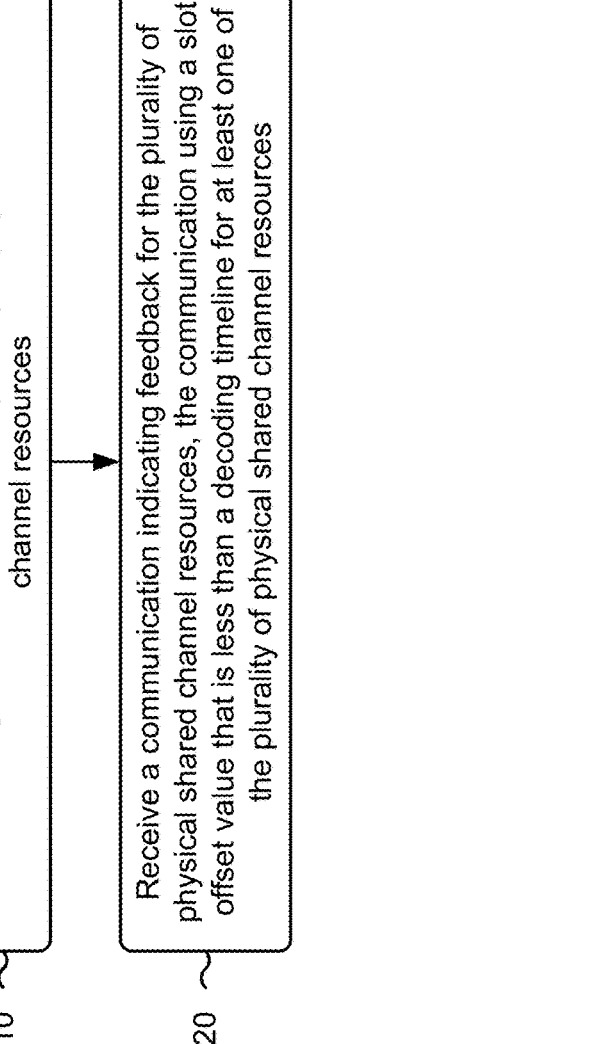

FIG. 8 is a diagram illustrating an example process 800 performed, for example, by a network node (e.g., a base station), in accordance with the present disclosure. Example process 800 is an example where the network node (e.g., network node 110) performs operations associated with early feedback for a multiple physical downlink shared channel grant.

As shown in FIG. 8, in some aspects, process 800 may include transmitting a grant associated with a plurality of physical shared channel resources (block 810). For example, the network node (e.g., using communication manager 150 and/or transmission component 1004, depicted in FIG. 10) may transmit a grant associated with a plurality of physical shared channel resources, as described above.

As further shown in FIG. 8, in some aspects, process 800 may include receiving a communication indicating feedback for the plurality of physical shared channel resources, the communication using a slot offset value that is less than a decoding timeline for at least one of the plurality of physical shared channel resources (block 820). For example, the network node (e.g., using communication manager 150 and/or reception component 1002, depicted in FIG. 10) may receive a communication indicating feedback for the plurality of physical shared channel resources, the communication using a slot offset value that is less than a decoding timeline for at least one of the plurality of physical shared channel resources, as described above.

Process 800 may include additional aspects, such as any single aspect or any combination of aspects described below and/or in connection with one or more other processes described elsewhere herein.

In a first aspect, the communication indicates feedback for a first subset of the plurality of physical shared channel resources.

In a second aspect, alone or in combination with the first aspect, process 800 includes receiving another communication indicating second feedback for a second subset of the plurality of physical shared channel resources.

In a third aspect, alone or in combination with one or more of the first and second aspects, the other communication indicates the second feedback using another slot offset value that corresponds to the slot offset value.

In a fourth aspect, alone or in combination with one or more of the first through third aspects, the second subset of the plurality of physical shared channel resources is associated with a non-numerical slot offset value.

In a fifth aspect, alone or in combination with one or more of the first through fourth aspects, the other communication includes a fixed number of feedback bits for each downlink control information associated with the grant, and the other communication includes an indication of non-acknowledgement associated with one or more of the plurality of physical shared channel resources.

In a sixth aspect, alone or in combination with one or more of the first through fifth aspects, the communication comprises a physical uplink control channel communication.

In a seventh aspect, alone or in combination with one or more of the first through sixth aspects, the communication includes a fixed number of feedback bits for each downlink control information associated with the grant.

In an eighth aspect, alone or in combination with one or more of the first through seventh aspects, the communication includes an indication of non-acknowledgement associated with one or more of the plurality of physical shared channel resources.

In a ninth aspect, alone or in combination with one or more of the first through eighth aspects, the communication is associated with a downlink assignment index that is incremented for each of the at least one of the plurality of physical shared channel resources.

In a tenth aspect, alone or in combination with one or more of the first through ninth aspects, process 800 includes receiving another communication indicating second feedback for a second subset of the plurality of physical shared channel resources, wherein the second subset includes one or more physical shared channel resources of the plurality of physical shared channel resources that are not included in the at least one of the plurality of physical shared channel resources, and wherein the other communication is associated with another downlink assignment index that is incremented based at least in part on a value of the downlink assignment index.

In an eleventh aspect, alone or in combination with one or more of the first through tenth aspects, the communication includes two downlink assignment indices.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
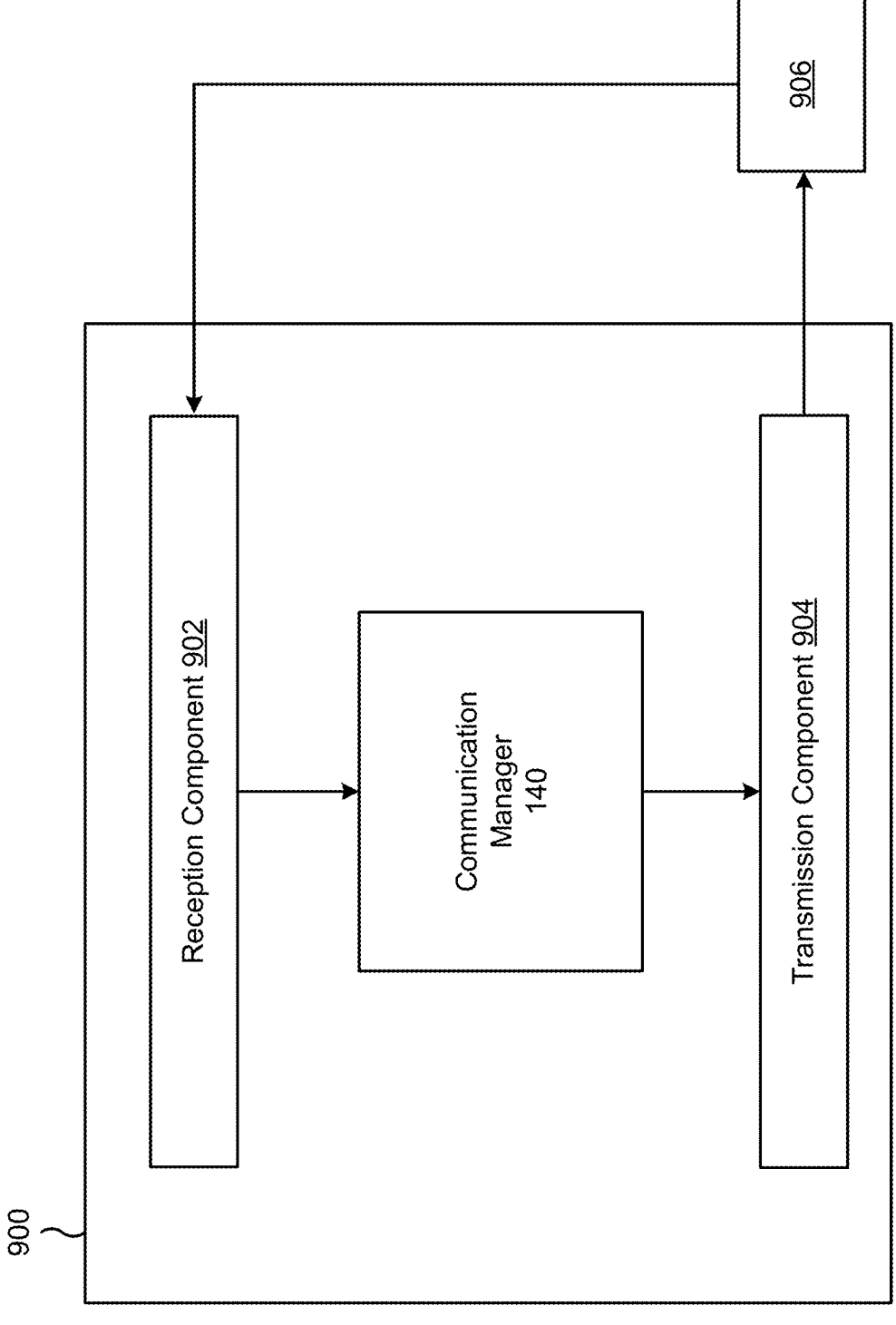
FIGS. 9 and 10 are diagrams of example apparatuses for wireless communication, in accordance with the present disclosure.

FIG. 9 is a diagram of an example apparatus 900 for wireless communication. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a network node, or another wireless communication device) using the reception component 902 and the transmission component 904. As further shown, the apparatus 900 may include the communication manager 140.

In some aspects, the apparatus 900 may be configured to perform one or more operations described herein in connection with FIGS. 5-8. Additionally, or alternatively, the apparatus 900 may be configured to perform one or more processes described herein, such as process 700 of FIG. 7. In some aspects, the apparatus 900 and/or one or more components shown in FIG. 9 may include one or more components of the UE described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the UE described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the UE described in connection with FIG. 2. In some aspects, the transmission component 904 may be co-located with the reception component 902 in a transceiver.

The reception component 902 may receive a grant associated with a plurality of physical shared channel resources. The transmission component 904 may transmit a communication indicating feedback for the plurality of physical shared channel resources using a slot offset value that is less than a decoding timeline for at least one of the plurality of physical shared channel resources.

The transmission component 904 may transmit another communication indicating second feedback for a second subset of the plurality of physical shared channel resources.

The transmission component 904 may transmit another communication indicating second feedback for a second subset of the plurality of physical shared channel resources, wherein the second subset includes one or more physical shared channel resources of the plurality of physical shared channel resources that are not included in the at least one of the plurality of physical shared channel resources, and wherein the other communication is associated with another downlink assignment index that is incremented based at least in part on a value of the downlink assignment index.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
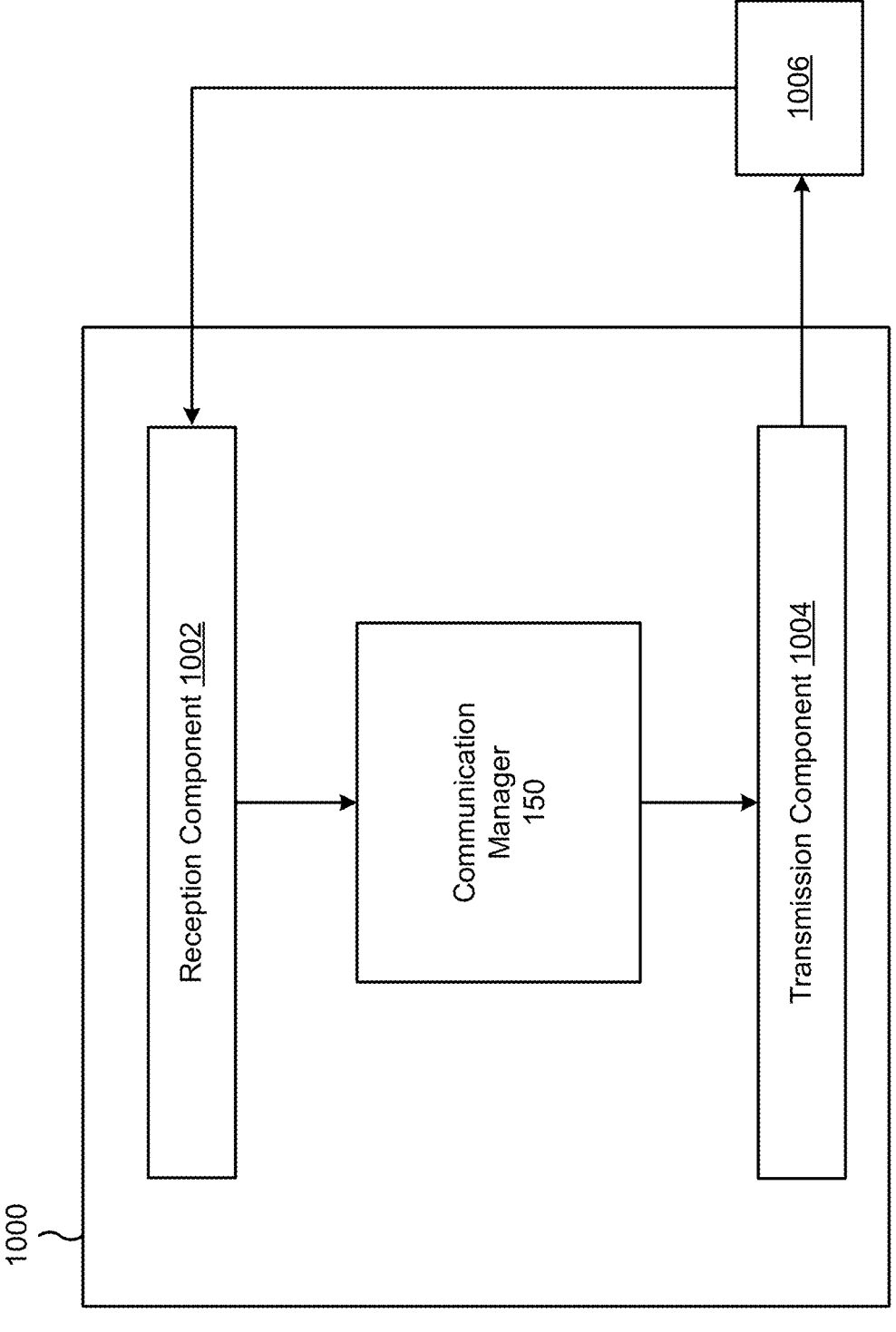

FIG. 10 is a diagram of an example apparatus 1000 for wireless communication. The apparatus 1000 may be a network node (e.g., abase station), or a network node may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a network node, or another wireless communication device) using the reception component 1002 and the transmission component 1004. As further shown, the apparatus 1000 may include the communication manager 150.

In some aspects, the apparatus 1000 may be configured to perform one or more operations described herein in connection with FIGS. 5-8. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the network node described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the network node described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the network node described in connection with FIG. 2. In some aspects, the transmission component 1004 may be co-located with the reception component 1002 in a transceiver.

The transmission component 1004 may transmit a grant associated with a plurality of physical shared channel resources. The reception component 1002 may receive a communication indicating feedback for the plurality of physical shared channel resources, the communication using a slot offset value that is less than a decoding timeline for at least one of the plurality of physical shared channel resources.

The reception component 1002 may receive another communication indicating second feedback for a second subset of the plurality of physical shared channel resources.

The reception component 1002 may receive another communication indicating second feedback for a second subset of the plurality of physical shared channel resources, wherein the second subset includes one or more physical shared channel resources of the plurality of physical shared channel resources that are not included in the at least one of the plurality of physical shared channel resources, and wherein the other communication is associated with another downlink assignment index that is incremented based at least in part on a value of the downlink assignment index.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a user equipment (UE), comprising: receiving a grant associated with a plurality of physical shared channel resources; and transmitting a communication indicating feedback for the plurality of physical shared channel resources using a slot offset value that is less than a decoding timeline for at least one of the plurality of physical shared channel resources.

Aspect 2: The method of Aspect 1, wherein the communication indicates feedback for a first subset of the plurality of physical shared channel resources.

Aspect 3: The method of any of Aspects 1 or 2, further comprising: transmitting another communication indicating second feedback for a second subset of the plurality of physical shared channel resources.

Aspect 4: The method of Aspect 3, wherein transmitting the other communication indicating the second feedback comprises: transmitting the other communication indicating the second feedback using another slot offset value that corresponds to the slot offset value.

Aspect 5: The method of Aspect 3, wherein the second subset of the plurality of physical shared channel resources is associated with a non-numerical slot offset value.

Aspect 6: The method of Aspect 3, wherein the other communication includes a set of feedback bits bundled based at least in part on a number of the plurality of physical shared channel resources that were not received by the UE before transmission of the communication.

Aspect 7: The method of Aspect 3, wherein the other communication includes a fixed number of feedback bits for each downlink control information associated with the grant, and wherein the other communication includes an indication of non-acknowledgement associated with one or more of the plurality of physical shared channel resources.

Aspect 8: The method of any of Aspects 1-7, wherein the communication includes a set of feedback bits bundled based at least in part on a number of the plurality of physical shared channel resources received by the UE before transmission of the communication.

Aspect 9: The method of any of Aspects 1-8, wherein the communication includes a fixed number of feedback bits for each downlink control information associated with the grant.

Aspect 10: The method of Aspect 9, wherein the communication includes an indication of non-acknowledgement associated with one or more of the plurality of physical shared channel resources.

Aspect 11: The method of any of Aspects 1-10, wherein the communication is associated with a downlink assignment index that is incremented for each of the at least one of the plurality of physical shared channel resources.

Aspect 12: The method of Aspect 11, further comprising: transmitting another communication indicating second feedback for a second subset of the plurality of physical shared channel resources, wherein the second subset includes one or more physical shared channel resources of the plurality of physical shared channel resources that are not included in the at least one of the plurality of physical shared channel resources, and wherein the other communication is associated with another downlink assignment index that is incremented based at least in part on a value of the downlink assignment index.

Aspect 13: The method of any of Aspects 1-12, wherein the communication includes two downlink assignment indices.

Aspect 14: The method of any of Aspects 1-13, wherein the communication includes two downlink assignment indices.

Aspect 15: The method of any of Aspects 1-14, wherein the communication includes two downlink assignment indices.

Aspect 16: The method of any of Aspects 1-15, wherein the communication comprises a physical uplink control channel communication.

Aspect 17: A method of wireless communication performed by a network node, comprising: transmitting a grant associated with a plurality of physical shared channel resources; and receiving a communication indicating feedback for the plurality of physical shared channel resources, the communication using a slot offset value that is less than a decoding timeline for at least one of the plurality of physical shared channel resources.

Aspect 18: The method of Aspect 17, wherein the communication indicates feedback for a first subset of the plurality of physical shared channel resources.

Aspect 19: The method of any of Aspects 17 or 18, further comprising: receiving another communication indicating second feedback for a second subset of the plurality of physical shared channel resources.

Aspect 20: The method of Aspect 19, wherein the other communication indicates the second feedback using another slot offset value that corresponds to the slot offset value.

Aspect 21: The method of Aspect 19, wherein the second subset of the plurality of physical shared channel resources is associated with a non-numerical slot offset value.

Aspect 22: The method of Aspect 19, wherein the other communication includes a fixed number of feedback bits for each downlink control information associated with the grant, and wherein the other communication includes an indication of non-acknowledgement associated with one or more of the plurality of physical shared channel resources.

Aspect 23: The method of any of Aspects 17-22, wherein the communication comprises a physical uplink control channel communication.

Aspect 24: The method of any of Aspects 17-23, wherein the communication includes a fixed number of feedback bits for each downlink control information associated with the grant.

Aspect 25: The method of Aspect 24, wherein the communication includes an indication of non-acknowledgement associated with one or more of the plurality of physical shared channel resources.

Aspect 26: The method of any of Aspects 17-25, wherein the communication is associated with a downlink assignment index that is incremented for each of the at least one of the plurality of physical shared channel resources.

Aspect 27: The method of Aspect 26, further comprising: receiving another communication indicating second feedback for a second subset of the plurality of physical shared channel resources, wherein the second subset includes one or more physical shared channel resources of the plurality of physical shared channel resources that are not included in the at least one of the plurality of physical shared channel resources, and wherein the other communication is associated with another downlink assignment index that is incremented based at least in part on a value of the downlink assignment index.

Aspect 28: The method of any of Aspects 17-27, wherein the communication includes two downlink assignment indices.

Aspect 29: An apparatus for wireless communication at a device, comprising a processor; memory coupled with the processor; and instructions stored in the memory and executable by the processor to cause the apparatus to perform the method of one or more of Aspects 1-16.

Aspect 30: An apparatus for wireless communication at a device, comprising a processor; memory coupled with the processor; and instructions stored in the memory and executable by the processor to cause the apparatus to perform the method of one or more of Aspects 17-28.

Aspect 31: A device for wireless communication, comprising a memory and one or more processors coupled to the memory, the one or more processors configured to perform the method of one or more of Aspects 1-16.

Aspect 32: A device for wireless communication, comprising a memory and one or more processors coupled to the memory, the one or more processors configured to perform the method of one or more of Aspects 17-28.

Aspect 33: An apparatus for wireless communication, comprising at least one means for performing the method of one or more of Aspects 1-16.

Aspect 34: An apparatus for wireless communication, comprising at least one means for performing the method of one or more of Aspects 17-28.

Aspect 35: A non-transitory computer-readable medium storing code for wireless communication, the code comprising instructions executable by a processor to perform the method of one or more of Aspects 1-16.

Aspect 36: A non-transitory computer-readable medium storing code for wireless communication, the code comprising instructions executable by a processor to perform the method of one or more of Aspects 17-28.

Aspect 37: A non-transitory computer-readable medium storing a set of instructions for wireless communication, the set of instructions comprising one or more instructions that, when executed by one or more processors of a device, cause the device to perform the method of one or more of Aspects 1-16.

Aspect 38: A non-transitory computer-readable medium storing a set of instructions for wireless communication, the set of instructions comprising one or more instructions that, when executed by one or more processors of a device, cause the device to perform the method of one or more of Aspects 17-28.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
one or more memories; and
one or more processors, coupled to the one or more memories, individually or collectively configured to cause the UE to:
receive a grant associated with a plurality of physical shared channel resources;
transmit, using a slot offset value that is less than a decoding timeline for at least one of the plurality of physical shared channel resources, an uplink communication indicating feedback for a first subset of the plurality of physical shared channel resources that have been decoded, wherein the uplink communication includes two downlink assignment indices and a set of feedback bits bundled in a time domain based at least in part on a number of the plurality of physical shared channel resources received by the UE before transmission of the uplink communication; and
transmit another communication indicating second feedback for a second subset of the plurality of physical shared channel resources, wherein a non-numerical slot offset value associated with the second feedback indicates that the second feedback is provided in a next physical uplink control channel resource that satisfies the decoding timeline.

28

2. The UE of claim 1, wherein the non-numerical slot offset value comprises a non-numerical k1 value.

3. The UE of claim 1, wherein the slot offset value corresponds to the non-numerical slot offset value.

4. The UE of claim 2, wherein feedback for a final three physical shared channel resources of the plurality of physical shared channel resources is indicated by a physical uplink control channel communication transmitted after the decoding timeline.

5. The UE of claim 1, wherein the other communication includes a set of feedback bits bundled based at least in part on a number of the plurality of physical shared channel resources that were not received by the UE before the transmission of the uplink communication.

6. The UE of claim 1, wherein the other communication includes a fixed number of feedback bits for each downlink control information associated with the grant, and
wherein the other communication includes an indication of non-acknowledgement associated with one or more of the plurality of physical shared channel resources.

7. The UE of claim 1, wherein the uplink communication includes the set of feedback bits bundled in the time domain based at least in part on a number of the plurality of physical shared channel resources received and decoded by the UE before the transmission of the uplink communication.

8. The UE of claim 1, wherein the set of feedback bits is a fixed number of feedback bits for each downlink control information associated with the grant.

9. The UE of claim 8, wherein the uplink communication includes an indication of non-acknowledgement associated with one or more of the plurality of physical shared channel resources.

10. The UE of claim 1, wherein at least one downlink assignment index of the two downlink assignment indices is incremented for each of the at least one of the plurality of physical shared channel resources.

11. The UE of claim 10, wherein
the second subset includes one or more physical shared channel resources of the plurality of physical shared channel resources that are not included in the at least one of the plurality of physical shared channel resources, and
wherein the other communication is associated with another downlink assignment index that is incremented based at least in part on a value of the at least one downlink assignment index.

12. The UE of claim 10, wherein the one or more processors, to transmit the uplink communication, individually or collectively, are configured to cause the UE to:
transmit the uplink communication for a single grant per physical downlink control channel monitoring occasion.

13. The UE of claim 1, wherein at least one downlink assignment index of the two downlink assignment indices is incremented for each of the plurality of physical shared channel resources associated with slot offset values that are less than the decoding timeline.

14. The UE of claim 1, wherein the uplink communication comprises a control channel communication.

15. The UE of claim 1, wherein the uplink communication comprises a physical uplink control channel communication.

16. A network node for wireless communication, comprising:
one or more memories; and
one or more processors, coupled to the one or more memories, individually or collectively configured to cause the network node to:

transmit, to a user equipment (UE) a grant associated with a plurality of physical shared channel resources;

receive, from the UE and using a slot offset value that is less than a decoding timeline for at least one of the plurality of physical shared channel resources, an uplink communication indicating feedback for a first subset of the plurality of physical shared channel resources that have been decoded, wherein the uplink communication includes two downlink assignment indices and a set of feedback bits bundled in a time domain based at least in part on a number of the plurality of physical shared channel resources received by the UE before transmission of the uplink communication by the UE; and receive, from the UE, another communication indicating second feedback for a second subset of the plurality of physical shared channel resources, wherein a non-numerical slot offset value associated with the second feedback indicates that the second feedback is provided in a next physical uplink control channel resource that satisfies the decoding timeline.

17. The network node of claim 16, wherein the non-numerical slot offset value comprises a non-numerical k1 value.

18. The network node of claim 16, wherein the slot offset value corresponds to the non-numerical slot offset value.

19. The network node of claim 17, wherein feedback for a final three physical shared channel resources of the plurality of physical shared channel resources is indicated by a physical uplink control channel communication transmitted after the decoding timeline.

20. The network node of claim 16, wherein the other communication includes a fixed number of feedback bits for each downlink control information associated with the grant, and wherein the other communication includes an indication of non-acknowledgement associated with one or more of the plurality of physical shared channel resources.

21. The network node of claim 16, wherein the uplink communication comprises a physical uplink control channel communication.

22. The network node of claim 16, wherein the set of feedback bits is a fixed number of feedback bits for each downlink control information associated with the grant.

23. The network node of claim 22, wherein the uplink communication includes an indication of non-acknowledgement associated with one or more of the plurality of physical shared channel resources.

24. The network node of claim 16, wherein at least one downlink assignment index of the two downlink assignment indices is incremented for each of the at least one of the plurality of physical shared channel resources.

25. The network node of claim 24, wherein the second subset includes one or more physical shared channel resources of the plurality of physical shared channel resources that are not included in the at least one of the plurality of physical shared channel resources, and wherein the other communication is associated with another downlink assignment index that is incremented based at least in part on a value of the at least one downlink assignment index.

26. A method of wireless communication performed by a user equipment (UE), comprising:

receiving a grant associated with a plurality of physical shared channel resources;

transmitting, using a slot offset value that is less than a decoding timeline for at least one of the plurality of physical shared channel resources, an uplink communication indicating feedback for a first subset of the plurality of physical shared channel resources that have been decoded, wherein the uplink communication includes two downlink assignment indices and a set of feedback bits bundled in a time domain based at least in part on a number of the plurality of physical shared channel resources received by the UE before transmission of the uplink communication; and transmitting another communication indicating second feedback for a second subset of the plurality of physical shared channel resources, wherein a non-numerical slot offset value associated with the second feedback indicates that the second feedback is provided in a next physical uplink control channel resource that satisfies the decoding timeline.

27. A method of wireless communication performed by a network node, comprising:

transmitting, to a user equipment (UE), a grant associated with a plurality of physical shared channel resources;

receiving, from the UE and using a slot offset value that is less than a decoding timeline for at least one of the plurality of physical shared channel resources, an uplink communication indicating feedback for a first subset of the plurality of physical shared channel resources that have been decoded, wherein the uplink communication includes two downlink assignment indices and a set of feedback bits bundled in a time domain based at least in part on a number of the plurality of physical shared channel resources received by the UE before transmission of the uplink communication by the UE; and receiving, from the UE, another communication indicating second feedback for a second subset of the plurality of physical shared channel resources, wherein a non-numerical slot offset value associated with the second feedback indicates that the second feedback is provided in a next physical uplink control channel resource that satisfies the decoding timeline.

28. The method of claim 26, wherein the non-numerical slot offset value comprises a non-numerical k1 value.

29. The method of claim 26, wherein the slot offset value corresponds to the non-numerical slot offset value.

30. The method of claim 26, wherein feedback for a final three physical shared channel resources of the plurality of physical shared channel resources is indicated by a physical uplink control channel communication transmitted after the decoding timeline.

* * * * *